United States Patent [19]
Needham

[11] Patent Number: 5,927,168
[45] Date of Patent: Jul. 27, 1999

[54] TOOL UNIT CLAMPING APPARATUS HAVING IMPROVED SHORT STROKE LOCKING MECHANISM

[75] Inventor: Greg W. Needham, Raleigh, N.C.

[73] Assignee: Kennametal Inc., Latrobe, Pa.

[21] Appl. No.: 08/423,617

[22] Filed: Apr. 17, 1995

[51] Int. Cl.⁶ .................................................. B23C 5/26
[52] U.S. Cl. ........................... 82/160; 82/158; 409/234; 279/75
[58] Field of Search ....................... 82/158, 160; 279/30, 279/75, 82, 905; 407/89; 408/239 A, 239 R, 240; 409/232, 233, 234

[56] References Cited

U.S. PATENT DOCUMENTS

| | | | |
|---|---|---|---|
| 2,926,020 | 2/1960 | Dayton et al. .............................. | 279/75 |
| 4,209,182 | 6/1980 | Sheldon .................................... | 279/75 |
| 4,708,040 | 11/1987 | Erickson . | |
| 4,723,877 | 2/1988 | Erickson . | |
| 4,726,268 | 2/1988 | Erickson . | |
| 4,726,269 | 2/1988 | Erickson . | |
| 4,736,659 | 4/1988 | Erickson . | |
| 4,747,735 | 5/1988 | Erickson et al. . | |
| 4,836,068 | 6/1989 | Erickson . | |
| 4,932,295 | 6/1990 | Erickson . | |
| 4,951,536 | 8/1990 | Robertson . | |
| 5,173,017 | 12/1992 | Oshnock et al. . | |
| 5,193,954 | 3/1993 | Hunt ....................................... | 409/233 |
| 5,245,896 | 9/1993 | Erickson et al. . | |
| 5,261,302 | 11/1993 | Erickson et al. . | |

FOREIGN PATENT DOCUMENTS

| | | | |
|---|---|---|---|
| 3606331 | 9/1987 | Germany .................................. | 279/75 |
| 3829331 | 3/1990 | Germany .................................. | 279/905 |

OTHER PUBLICATIONS

International Search Report.

*Primary Examiner*—Andrea L. Pitts
*Assistant Examiner*—Henry W. H. Tsai
*Attorney, Agent, or Firm*—James G. Porcelli; John J. Prizzi

[57] ABSTRACT

An improved, short-stroke clamping apparatus for detachably connecting a tool unit to a tool supporter is provided of the type having a canister member which includes apertures for admitting spherical locking elements, and a lock rod that is reciprocally movable a stroke distance along an axis and which has cam portions for moving the spherical locking elements through the canister apertures into engagement with the tool unit. In the improved clamping apparatus, the canister member apertures are elongated along the stroke axis. This allows the spherical locking elements to move axially along the cam portions of the lock rod as well as radially, such that locking engagement can be achieved with a shorter axial stroke movement of the lock rod. The aperture walls may also be angled toward the spherical locking elements to allow even greater axial movement of the locking elements, thereby further shortening the lock rod stroke. The shorter lock rod stroke in turn advantageously shortens the tool envelope, and increases both the rigidity and life of the spring package that withdraws the lock rod.

19 Claims, 6 Drawing Sheets

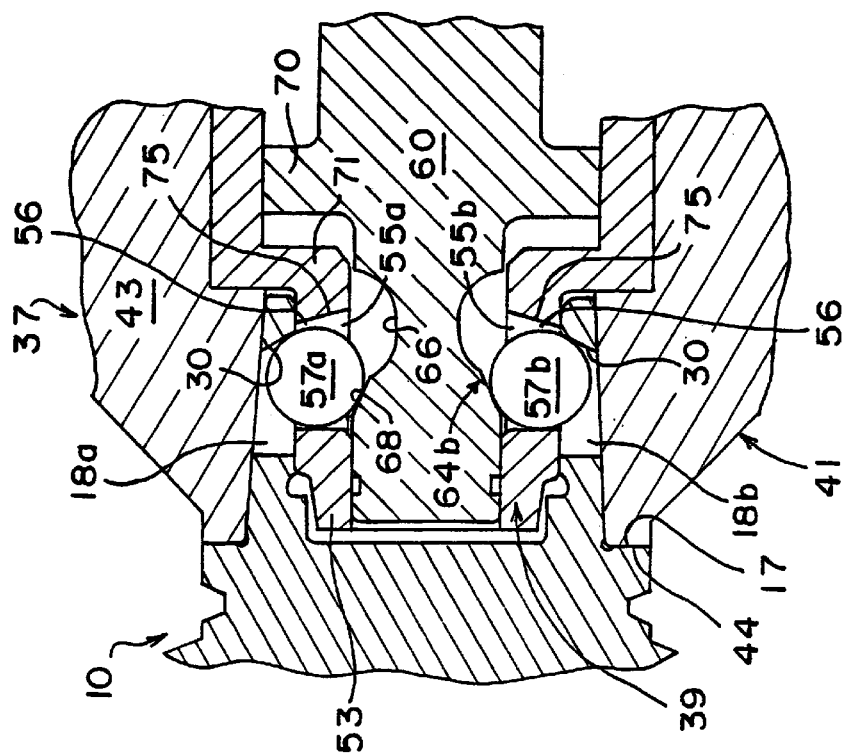
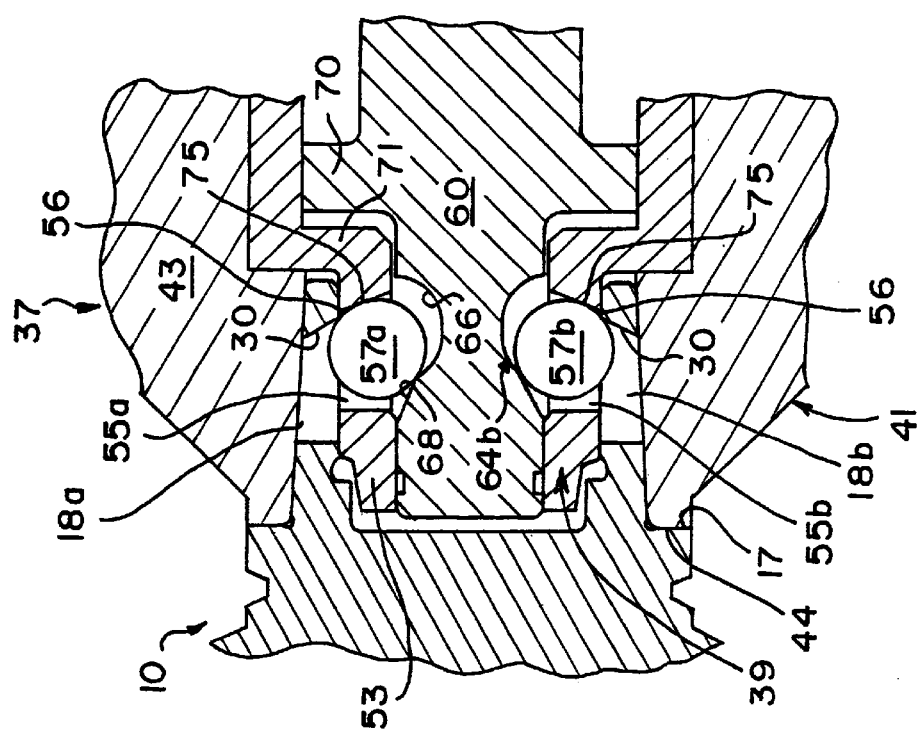

TOOL UNIT CLAMPING APPARATUS HAVING IMPROVED SHORT STROKE LOCKING MECHANISM

BACKGROUND OF THE INVENTION

This invention generally relates to an improved lock rod clamping apparatus for detachably connecting a tool unit to a tool supporter, and is particularly concerned with such an apparatus having a shortened lock rod stroke.

Clamping mechanisms for detachably connecting a tool unit to a tool supporter are well known in the art. Such mechanisms are typically used in machining operations where the tool unit holds a cutting insert that is moved into and out of cutting engagement with a rotating metal workpiece. The clamping apparatus allows different tool units holding different cutting inserts to be quickly attached to and detached from the tool supporter which in turn is connected to a device that controls the movement of the tool unit with respect to the workpiece.

One of the most commercially successful clamping mechanisms includes a cylindrically-shaped canister member that is matable with the tubular end of a tool unit and which includes apertures for admitting locking elements into locking engagement with recesses present in the tool unit. The locking elements, which are typically spherical, are radially moved through the apertures in the canister member by means of a reciprocating lock rod having cam portions that engage the locking elements. Examples of such a clamping mechanism are disclosed in Erickson U.S. Pat. Nos. 4,708,040; 4,747,735; 4,836,068, and 4,932,295, each of which is assigned to Kennametal, Inc. located in Latrobe, Pa.

Such a clamping mechanism is illustrated in FIG. 6. Here, a side cross-sectional view of the distal end 62 of a canister member 39 is shown which includes an aperture 54a in the form of a cylindrical bore through the wall of the member 39. The inner diameter of the circular bore forming the aperture 54a closely approximates the outer diameter of the spherical locking element 57a. The lock rod 60 includes a cam portion 64a having a spherical depression 66 which tapers off into a ramp 68. When the spherical locking element 57a is seated in the depression 66, and the stop flange 70 of the lock rod 60 abuts annular wall 71, the spherical element 57a is in a non-locking position which would allow the tubular shank 16 of a tool unit 10 to be inserted into the annular recess 59 of the coupling member 43. However, when the lock rod 60 is moved to the right in the position illustrated, the ramp 68 of the cam portion 64a wedgingly engages and raises the spherical locking element 57a into the locking position. In such a position, the spherical locking element 57a will wedgingly and lockingly bear against an angled wall 30 of the tool unit 10.

While such a prior art locking mechanism has proven its capability of quickly, conveniently, and rigidly attaching a tool unit to a tool supporter, the applicant has observed that if the stroke of the lock rod could be shortened, the overall envelope of the clamping mechanism could likewise be shortened. Such a shortened tool envelope would facilitate machining operations by allowing the operator to more conveniently use the clamping mechanism without interference from surrounding tools or other obstructions. Even more importantly, a shorter lock rod stroke would reduce the stresses applied to the spring package used to pull the lock rod from an unlocked to a locked position. Such a spring package may take the form of a hydraulic cylinder connected to the lock rod, or a stack of resiliently compressed Bellville washers slidably mounted around the proximal end of the canister member. Where stacked Bellville washers are used, a shorter lock rod stroke would allow the use of a shorter stack of washers while increasing their useful life span. Alternatively, a regular size spring package of such washers could be used in combination with a shorter lock rod stroke to produce a clamping mechanism that gripped a tool unit with a greater holding force, which in turn would increase the tool rigidity and hence the accuracy of the machining operations performed by the tool unit.

Clearly, it would be highly advantageous if a way could be found to shorten the stroke of the lock rod used in such clamping mechanisms without sacrificing the convenience, speed, and rigidity that such a mechanism offers in attaching and detaching tool units to a tool supporter. Ideally, such a stroke-shortening solution should require only a minimal amount of modification to the shapes of existing parts so that a conventional clamping mechanism of the type previously described could easily be converted into an improved clamping mechanism with a minimum amount of component redesign and machining.

SUMMARY OF THE INVENTION

The invention is an improved lock rod clamping apparatus wherein the apertures of the canister member are elongated along the stroke axis of the lock rod for allowing the locking elements (which are preferably spheres) to move axially along the cam portions of the lock rod as well as radially such that the locking elements move into locking engagement with the tool unit with a shorter axial stroke of the lock rod.

In the preferred embodiment of the invention, the apertures of the canister member are elongated to a length between about 5% and 30% greater than the diameter of the locking spheres in a direction opposite from the ramp of the cam portions of the lock rod. At the same time, the position of the cam portions are moved in the direction of the elongation of the canister member apertures between about 5% and 30% of the original diameter of the apertures. These modifications of the clamping apparatus advantageously reduce the length of the lock rod stroke between about 5% and 30%. In a more preferred embodiment, the length of both the elongation of the apertures and the displacement of the cam portions is between about 15% and 25% of the original length of the apertures, which in turn shortens the stroke of the lock rod by 15% to 25%.

The invention further comprises angling the walls of the apertures in the canister member that are opposite the ramp of the cam portions of the lock rod between about 10° and 45° toward the locking sphere with respect to a line extending radially from the axis of reciprocation of the lock rod. Such angling of the aperture walls advantageously reduces the stroke of the lock rod an additional 5% to 25%. In a preferred embodiment, the angling of the aperture walls is between about 10° and 20° which in turn shortens the lock rod stroke an additional 7% to 9%.

When the elongation of the apertures of the canister member is combined with the aforementioned preferred angling of the aperture walls, the stroke length of the lock rod can be reduced between about 22% and 34%. Such a substantial stroke reduction allows the clamping apparatus to hold a tool unit within a smaller tool envelope, and with a smaller spring package. Additionally, such a modification permits reduction in the length of the lock rod. Because the aforementioned modifications lessen the amount of spring force necessary to achieve the same holding force as a conventional clamping mechanism a smaller spring package with longer lasting, spring elements (which are typically Bellville washers) may be used. Alternatively, a spring package of regular size and strength may be used to generate a substantially greater holding force out of the short stroke mechanism, which in turn provides greater tool rigidity and accuracy.

BRIEF DESCRIPTION OF THE SEVERAL FIGURES

Figure 4B:
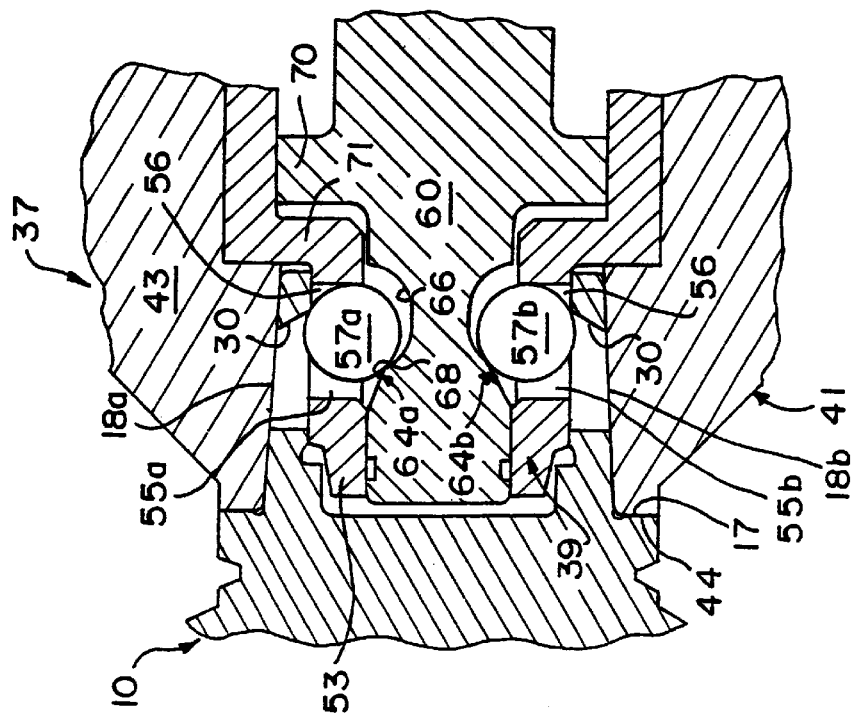
Figure 4A:
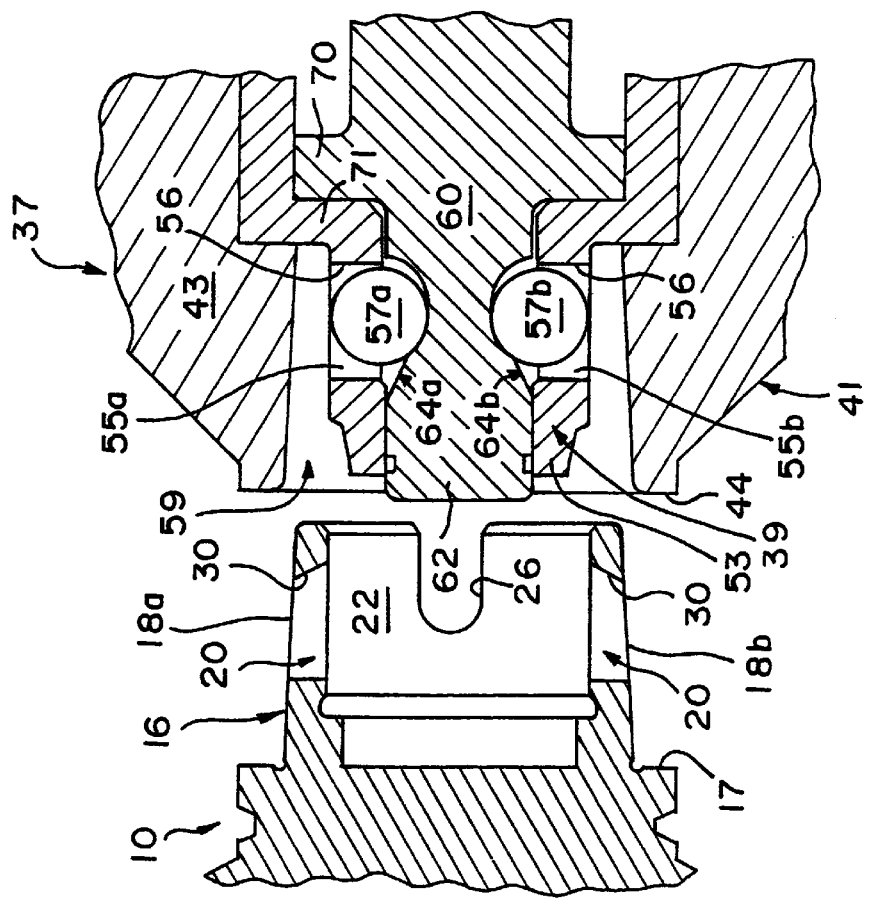
Figure 5A:
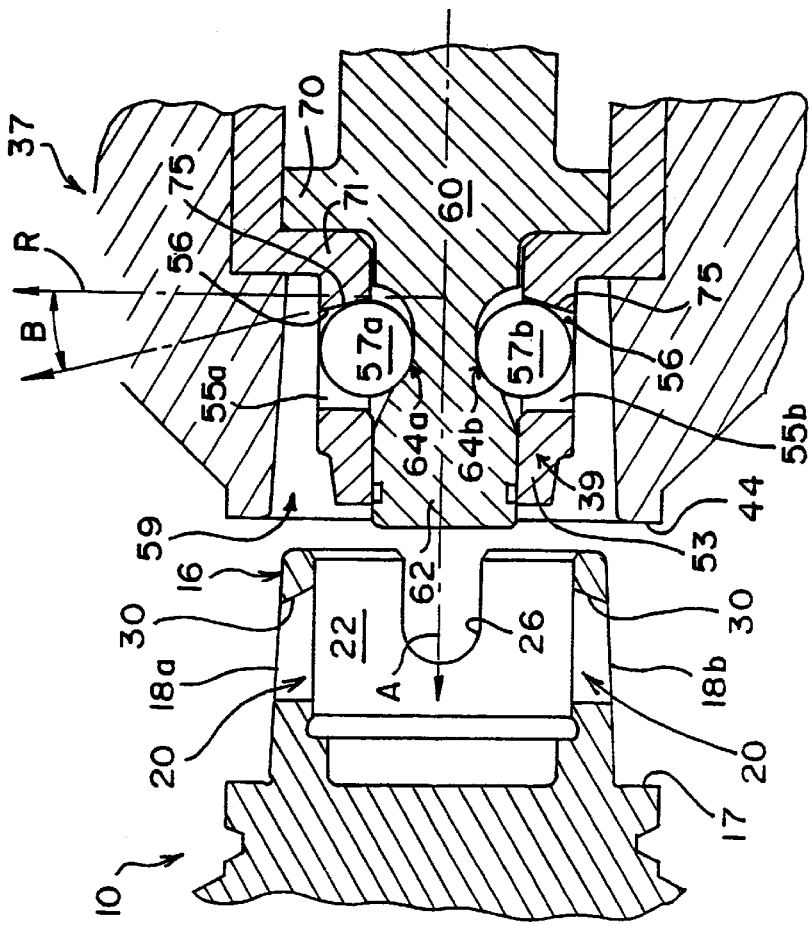
Figure 4C:
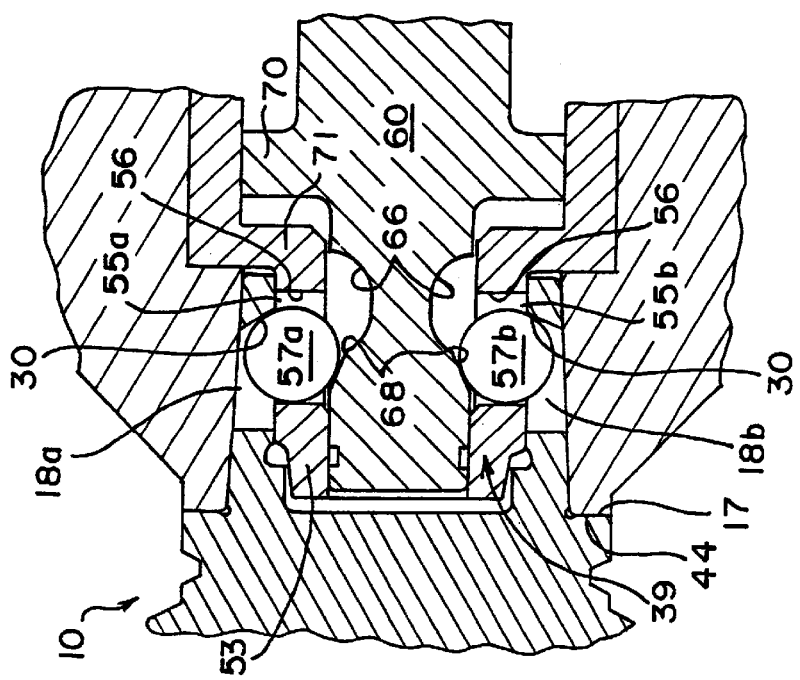
Figure 6:
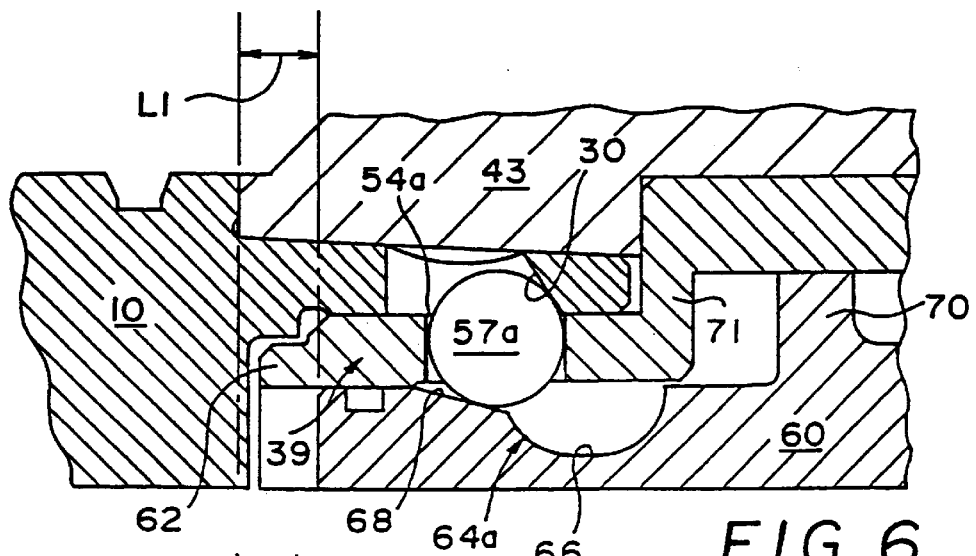
Figure 7:
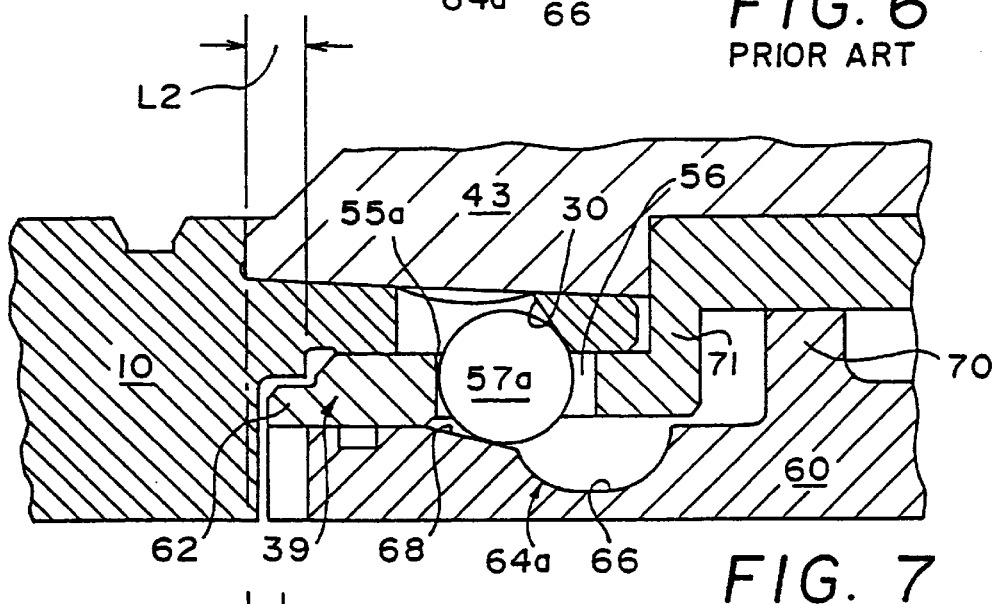
Figure 8:
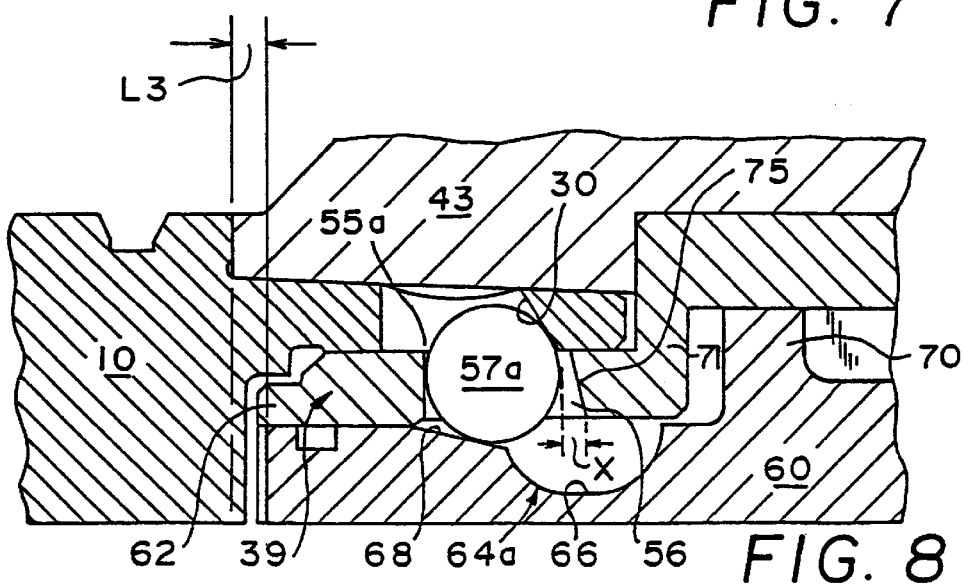

FIG. 4A, 4B, and 4C are cross-sectional side views illustrating how one embodiment of the clamping mechanism of the invention detachably secures a tool unit to a tool supporter;

FIGS. 5A, 5B, and 5C illustrate how a second embodiment of the clamping mechanism of the invention detachably connects a tool unit to a tool supporter;

FIG. 6 is an enlarged cross-sectional side view of the canister member, spherical locking element, and cam portion of the lock rod of a prior art clamping mechanism, illustrating the length $L_1$ of the lock rod stroke necessary to bring the spherical locking element to a locking position;

FIG. 7 is an enlarged cross-sectional side view of the canister member, spherical locking element, and cam portion of the lock rod of one embodiment of the clamping mechanism of the invention, illustrating the shorter stroke length $L_2$ of the lock rod necessary to bring the spherical locking element to a locking position, and FIG. 8 is a cross-sectional side view of the canister member, spherical locking element, and cam portion of the lock rod of a second embodiment of the clamping mechanism of the invention, illustrating the even shorter stroke length $L_3$ of the lock rod necessary to bring the locking element to a locking position.

DETAILED DESCRIPTION OF THE PREFERRED EMBODIMENT

Figure 1:
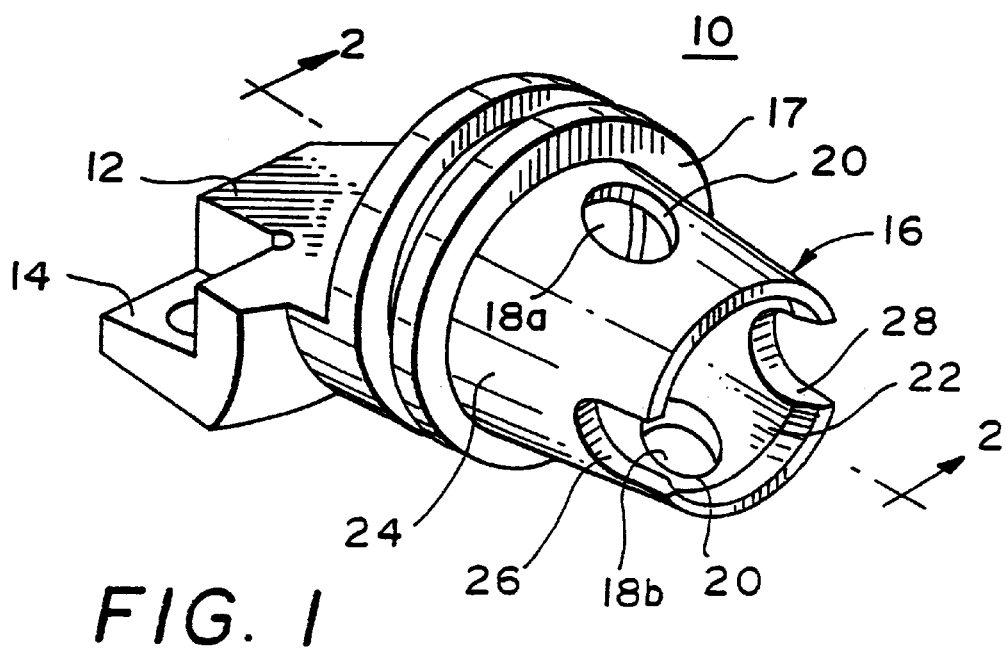
FIG. 1 is a perspective view of a tool unit of the type secured by the clamping mechanism of the invention.
Figure 2:
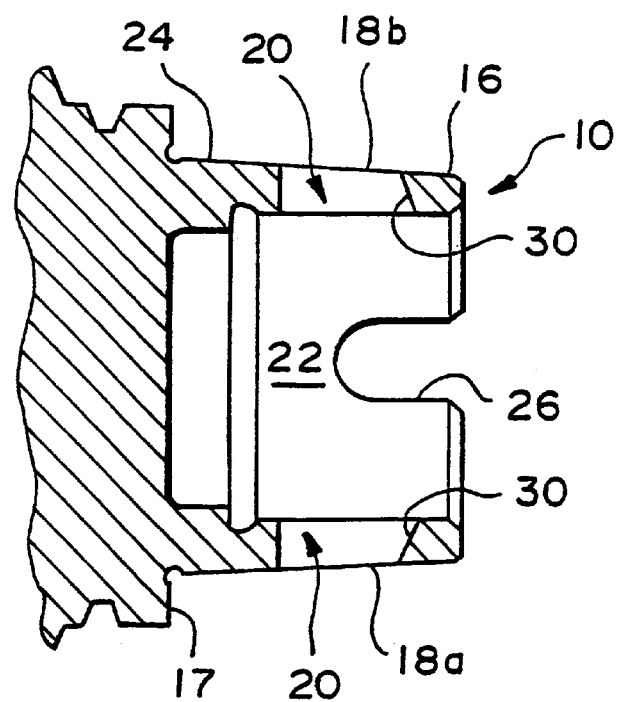
FIG. 2 is a cross-sectional side view of the tool unit illustrated in FIG. 1 along the line 2—2.

With reference now to FIGS. 1 and 2, the tool unit 10 used in conjunction with the clamping mechanism of the invention includes a forward end 12 for holding a cutting tool, and a rearward tubular shank 16 for connection to a tool supporter. The forward end 12 includes a recess or pocket 14 which is conventional in design for receiving an indexable cutting insert, locking bracket, and shim (not shown). At the junction between the forward end 12 and the tubular shank 16 is an annular abutment face 17 for engagement with the annular face of a tool supporter when the tool unit is connected to such a supporter by way of a clamping mechanism. The abutment face 17 is planar and is orthogonally oriented with respect to the longitudinal axis of the tubular shank 16.

As is indicated in FIG. 2, the tubular shank 16 is preferably integrally formed with the forward end 12 of the tool unit 10 from a single piece of steel, and has a frustro-conical shape. The shank 16 includes a pair of opposing openings 18a,b for receiving the spherical locking elements of the clamping mechanism which is described hereinafter. The walls 20 of the openings 18a,b are not cylindrical around their circumference, but instead include angled wall portions 30 (as shown in FIG. 2) for facilitating the locking engagement between the shank 16 and the spherical locking elements of the clamping mechanism. The inner surface 22 of the tubular shank 16 is substantially cylindrical in shape so as to closely mate with the outer surface of the canister member of the locking mechanism. The shank outer surface 24 is frustro-conical for the purposes of both centering and stiffening the coupling between the tool unit 10 and a tool supporter. Disposed orthogonally with respect to the opposing openings 18a,b are alignment slots 26 and 28. As will be explained, these slots 26,28 fit into protruding keys (not shown) present in the canister member 39 of the clamping mechanism to insure alignment between the openings 18a,b with the spherical locking elements of the clamping mechanism.

Figure 3:
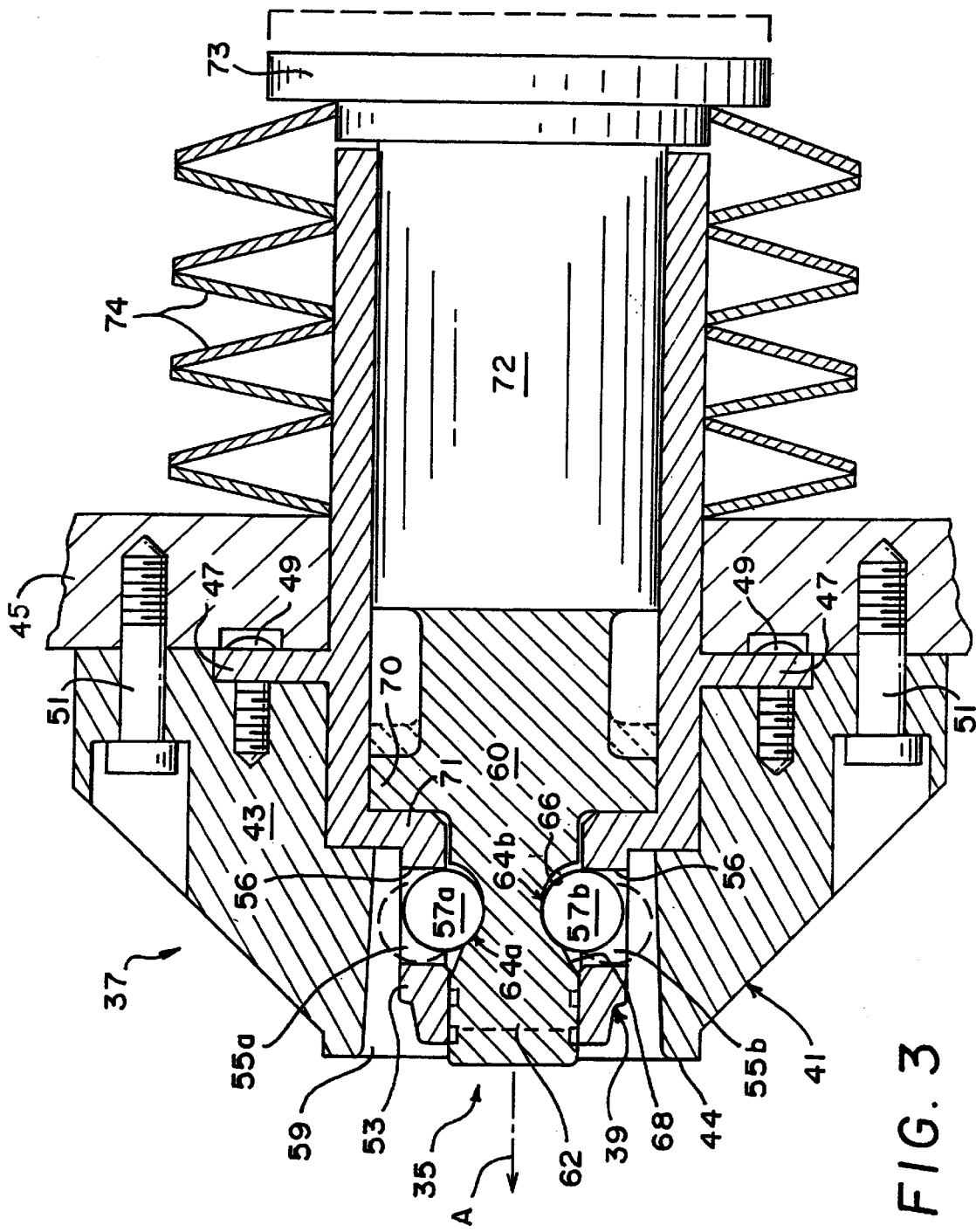
FIG. 3 is a side cross-sectional view of the clamping mechanism of the invention that detachably connects the tool unit of FIGS. 1 and 2 to a tool supporter.

With reference now to FIG. 3, the clamping mechanism 35 of the invention is disposed within a tool supporter 37 as shown. The clamping mechanism includes a cylindrically shaped canister member 39 mounted within a housing 41 formed from a frustro-conical coupling member 43. The coupling member 43 terminates, at its distal end, in an annular abutment face 44 that confronts the previously discussed abutment face 17 of the tool unit 10 when the two are connected. The tool supporter housing 37 further has a housing member 45 disposed behind the coupling member 43. The canister member 39 is affixed to the housing 41 by way of an annular flange 47 secured to the coupling member 43 by bolts 49. Coupling member 43 is in turn secured to the housing member 45 by means of bolts 51. Thus the canister member 39 remains stationary relative to the lock rod 60 during the operation of the clamping mechanism 35.

The distal end 53 of the canister member 39 includes a pair of opposing apertures 55a,b for admitting locking elements in the form of spheres 57a,b in the position shown in phantom. It is important to note that the walls of the apertures 55a,b are not cylindrical bores having an inner diameter that is slightly larger than the outer diameter of the locking spheres 57a,b. Rather, they are oval slots formed by the addition of an elongated portion 56 on a side of the apertures 55a,b opposite to the distal end 62 of the lock rod 60 for a purpose that will become evident shortly. The distal end 53 of the canister member 39 also includes the previously mentioned pair of alignment lugs (not shown) disposed at right angles to the apertures 55a,b. A frustro-conically shaped socket 59 is defined between the outer surface of the distal end 62 of the canister member 39, and the inner surface of the coupling member 43 for receiving the tool unit 10.

In addition to the canister member 39 and locking spheres 57a,b, the clamping mechanism 35 of the invention further includes lock rod 60 which is reciprocally movable along an axis A into the position illustrated in phantom. The lock rod 60 has a distal end 62 concentrically disposed within and slidably movable with respect to the distal end 53 of the canister member 39. The distal end 62 includes opposing cam portions 64a,b for radially (and to some extent axially) moving the locking spheres 57a,b into and out of the socket 59. To this end, each of the cam portions 64a,b includes a depression 66 which is partially complementary in shape to the spheres 57a,b, and a ramp 68 extending from one side of the depression 66 toward the distal end 62 of the rod 60. In the invention, the axial position of the cam portions 64a,b is displaced away from the distal end of the lock rod 60 a distance equal to the axial length of the elongated portion 56 of each of the canister member apertures 55a,b. Lock rod 60 further has an integrally formed stop flange 70 that engages an annular wall 71 of the canister member to arrest the stroke of the lock rod 60 in the distal direction. The proximal end of the lock rod 60 is formed from a cylindrical shaft 72 slidably mounted within the proximal end of the canister member 39. Shaft 72 terminates in a spring retainer 73. A spring package formed from eight stacked Bellville washers 74 constantly applies a tensile force to the spring retainer 73 that biases the lock rod 60 in the locking position illustrated in phantom.

The distal end of the lock rod 60 is used to physically bump the tool unit 10 from the coupling member 43 when the tool unit 10 is to be released. For that reason, if the tool unit 10 must be pushed out of the coupling member 43 for release, then the distal end of the lock rod 60 must be positioned relative to the tool unit 10 for such contact.

The operation of the first embodiment of the clamping mechanism 35 will now be described with respect to FIGS. 4A, 4B, and 4C. In the first step of the clamping operation, illustrated in FIG. 4A, the tubular shank 16 of the tool unit 10 is aligned for mating engagement with the frustro-conical socket 59 of the tool supporter 37. Specifically, the slots 26,28 are aligned with the previously mentioned alignment lugs (not shown) present on the exterior of the distal end 53 of the canister member 39. Additionally, the lock rod 60 is pushed toward the distal end 53 of the canister member 39 with a force sufficient to overcome the spring bias of the stack of Bellville washers 74. This compresses the spring washers 74 and causes the stop flange 70 of the lock rod 60 to abuttingly engage the annular wall 71 of the canister member 39 as shown, which in turn allows locking spheres 57a,b to be completely received within the depression 66 of each of the cam portions 64a,b. In such a position, the locking spheres 57a,b will not interfere with the insertion of the tubular shank 16 of the tool unit into the socket 59.

With reference now to FIG. 4B, the tubular shank 16 is inserted into the socket 59 until engagement occurs between the annular abutment faces 17 and 44. The operator of the clamping mechanism 35 then releases the compressive force applied to the spring washers 74. The expanding spring washers 74 in turn withdraw the shaft 72 of the reciprocally movable lock rod 60 away from the distal end 53 of the canister member 39. Upon such a withdrawal of the lock rod 60, the locking spheres 57a,b become engaged by the walls of the canister member 55a,b apertures opposite from the elongated portions 56 of these apertures. Such engagement unseats them from the spherical depression 66 of each of the cam portions 64a,b, and causes each of the locking spheres 57a,b climb the ramp 68 of each of the cam portions 64a,b. As the spheres climb up the ramps 68 of their respective cam portions 64a,b, it is important to note that the elongated walls 56 of the canister member apertures 55a,b allows the locking spheres 57a,b to move axially as well as radially into engagement with the tapered wall 30 of the tool unit shank apertures 18a,b. Additonally, the axial travel of the locking spheres 57a,b is in a direction opposite to the axial travel of the lock rod 60. As will be demonstrated in more detail hereinafter, this has the advantageous affect of advantageously shortening the amount of lock rod stroke necessary for the rod 60 to move from an unlocking to locking position.

When the spring washers 74 finally pull the lock rod 60 into the lock position illustrated in FIG. 4C, the ramps 68 of each of the cam portions 64a,b firmly wedge these spheres into locking engagement between the wall defining the elongated portion 56 of the canister member apertures 55a,b and the angled wall 30 of each of the locking sphere receiving apertures 18a,b of the tool unit 10. In this position, the locking spheres 57a,b firmly grip the tool unit 10 to the canister member 39.

FIGS. 5A through 5C illustrate the operation of another embodiment of the invention. This embodiment is structurally identical to the embodiment illustrated in FIGS. 4A through 4C with the sole exception that the wall 75 of the canister member apertures 55a,b that defines the elongated portion 56 is angled toward its respective locking sphere. In the preferred embodiment, the wall 75 is tilted at an angle B between about 10° and 20° with respect to a line R that extends radially from the axis A of reciprocation, and most preferably 15°.

The embodiment illustrated in FIGS. 5A through 5C operates in exactly the same way as the embodiment described with respect to FIGS. 4A through 4C with the exception that the angling of the wall 75 of each of the canister member apertures 55a,b allows the spheres 57a,b to move an even greater distance axially along the ramps 68 of the cam portions 64a,b of the lock rod 60. This additional axial component of motion is approximately equal to the axial component X (shown in FIG. 8) of the angle B made with respect to a line extending radially from the axis A. This increased component of axial motion of the locking spheres 57a,b significantly contributes to the shortening of the stroke of the lock rod 60, as will now be explained in detail.

FIGS. 6, 7, and 8 compare the length of the lock strokes of a clamping mechanism of the prior art, and the first and second embodiments of the clamping mechanism 35 of the invention. In the prior art clamping mechanism shown in FIG. 6, the canister member apertures 54a,b (of which only 54a is shown) are circular in shape, having an inner diameter that is approximately the same size as the outer diameter of their respective locking spheres 57a,b. Consequently, the lock rod 60 must move an axial stroke distance $L_1$ in order to raise the locking spheres 57a,b into the locking position illustrated.

By contrast, in the embodiment of the clamping mechanism 35 illustrated in FIG. 7, the sphere-conducting apertures 55a,b in the canister member 39 have an elongated portion 56 as shown. The elongated portion 56 allows some movement of the locking spheres 57a,b in the axial direction, as well as the radial direction when the lock rod 60 is withdrawn to the position illustrated. The component of axial movement afforded by the elongated portion 56 allows the locking spheres 57a,b to engage the angled wall 30 of the tool unit 10 with a shorter stroke $L_2$ of the lock rod 60. In this embodiment, the length of the elongated portion 56 relative to the diameter of the locking spheres 57a,b should be approximately 20%, which in turn results in an approximately 20% reduction in the length of the stroke $L_2$ relative to the length of the lock rod stroke $L_1$ of a prior art clamping mechanism.

It should be noted that the shorter lock rod 60 stroke necessitates a modification to the lock rod 60 if the lock rod 60 is to bump the tool unit 10. The distal end of the lock rod 60 is a greater distance from the cam portion 66 by an amount approximately equal to the reduced stroke of the lock rod 60. This is to permit the lock rod 60 to contact and bump the tool unit 10 for release.

In the embodiment of the invention illustrated in FIG. 8, the angling of the wall 75 opposite the elongated portion 56 of the canister member apertures 55a,b results in a widening of the aperture an additional distance x in the portion nearest the cam portion 64a,b of the lock rod 60. Such a widening allows an even greater amount of axial movement to occur with the locking spheres 57a,b as the lock rod 60 is withdrawn which in turn results in an even shorter lock rod stroke $L_3$ to get the locking spheres 57a,b into the working position illustrated. When the wall 75 is angled approximately 15° with respect to a line extending radially from the axis A of reciprocation, the lock rod stroke $L_1$ can be reduced an additional 8% over the 20% reduction achieved by solely elongating the apertures 55a,b. Thus the lock rod stroke $L_3$ of the embodiment illustrated in FIG. 8 is approximately 28% shorter than the lock rod stroke $L_1$ of a conventional clamping mechanism, and may be shortened by as much as 37%. It should again be noted that the shorter lock rod 60 stroke necessitates a modification to the lock rod 60 if the lock rod is to bump the tool unit. The distal end of the lock rod 60 is an even greater distance from the cam portion 66 by an amount approximately equal to the reduced stroke of the lock rod 60.

Although this invention has been described with respect to two preferred embodiments, various modifications, revisions, and additions will become evident to persons of ordinary skill in the art. All such revisions, modification, and additions are intended to be encompassed within the scope of this invention, which is limited only by the claims appended hereto.

What is claimed is:

1. An improved clamping apparatus for detachably connecting a tool unit to a tool supporter, comprised of:
   a locking element;
   a canister member that is matable with a tool unit and which includes an aperture for admitting the locking element, and
   a lock rod that is reciprocally movable a stroke distance along a longitudinal axis and having a cam portion for moving the locking element radially with respect to the axis through the canister aperture from an unlocked position into locking engagement with the tool unit,
   wherein the aperture of the canister member is elongated along the longitudinal axis from a cylindrical shape conforming to the locking element thereby defining at least one elongated wall for allowing the locking element to move axially along the cam portion as well as radially such that the locking element moves from an unlocked position into locking engagement with the tool unit with a shorter axial stroke distance of lock rod than that stroke required for an aperture having a cylindrical shape conforming to the locking element.

2. The clamping apparatus of claim 1, wherein the elongation of the aperture is between 5% and 30% of the length of the locking element along the axis.

3. The clamping apparatus of claim 2, wherein the elongation of the aperture is between about 17% and 23% of the length of the locking element along the axis.

4. The clamping apparatus of claim 3, wherein the elongation of the aperture is 20% of the length of the locking element along the axis.

5. The clamping apparatus of claim 1, wherein the cam portion includes a depression for receiving the locking element in a non-locking position, and a ramp on one the of the depression along the axis for radially displacing the locking element to a locking position.

6. The clamping apparatus of claim 5, wherein the aperture is elongated on a side of the aperture opposite from the ramp of the cam portion.

7. The clamping apparatus of claim 6, wherein the lock rod has a length which is defined by a distal end and the location of the cam portion and this length is reduced from that length necessary for passing the locking element through a cylindrical canister aperture by the amount the aperture is elongated.

8. The clamping apparatus of claim 1, wherein an elongated wall of the elongated canister aperture is canted at an acute angle with respect to a line projecting radially from the axis for allowing the locking element to move into locking engagement with the tool unit with a shorter axial stroke movement of the lock rod.

9. The clamping apparatus of claim 8, wherein the acute angle is between about 5° and 20° with respect to the radial line.

10. A clamping apparatus for detachably connecting a tool unit to a tool supporter, wherein the clamping apparatus is of the type having a canister member that is matable with a tool unit and which includes circular apertures for admitting spherical locking elements, the diameter of the apertures closely approximating the diameter of the spherical locking elements, and a lock rod having a reciprocating stroke along an axis and including cam portions for moving the spherical locking elements radially with respect to the axis through the apertures of the canister member into locking and unlocking engagement with the tool unit, wherein the improvement comprises:
    an elongation of the circular apertures of the canister member along the axis for allowing the spherical locking elements to move axially along the cam portions as well as radially such that the spherical locking elements move into locking engagement with the tool unit with a shorter axial stroke of the lock rod than that required for an aperture of a cylindrical shape conforming to the shape of the locking element.

11. The clamping apparatus of claim 10, wherein each of the cam portions includes a depression for receiving its respective spherical locking element in a non-locking position, and a ramp on only one side of the depression for wedgingly displacing a spherical locking element in a radial direction, and wherein the axial component of motion of the locking element is in a direction opposite to the axial stroke of the lock rod when the rod moves the spherical locking elements into locking engagement.

12. The clamping apparatus of claim 11, wherein the ramp is inclined between about 5° and 35° with respect to the axis.

13. The clamping apparatus of claim 11, wherein each elongation of the circular apertures is on a side opposite from the ramp of the cam portion.

14. The clamping apparatus of claim 13, wherein the length of the elongation for each aperture is between about 5% and 30% of the diameter of the circular aperture, and wherein the length of the stroke of the lock rod is reduced about 5% and 30%.

15. The clamping apparatus of claim 14, wherein a wall of each of the apertures that defines the elongation is canted at an acute angle with respect to a line orthogonal to the axis for allowing the locking elements to move into locking engagement with the tool unit with a shorter axial stroke of the lock rod.

16. The clamping apparatus of claim 15, wherein the acute angle is between about 10° and 45° with respect to the orthogonal line R, and the stroke of the lock rod is shortened an additional amount between about 5% and 25% of the stroke.

17. A clamping apparatus for detachably connecting a tool unit to a tool supporter, wherein the apparatus is of the type having a canister member that is matable with a tool unit, and a lock rod having a reciprocating stroke along an axis and cam portions for moving locking elements radially with respect to the axis through apertures in the canister member into locking engagement with the tool unit, each of said cam portions including a depression for receiving a locking element, and a ramp on one side of the depression for radially moving a locking element, wherein the walls defining the canister apertures are orthogonal with respect to the axis, wherein the improvement comprises:

angling one of the walls of each of the apertures with respect to said orthogonal walls such that a portion of said apertures closest to the lock rod is widened along said axis for allowing the locking elements to move axially along the cam portions as well as radially such that the locking elements move into locking engagement with a shortened axial stroke of the lock rod, said angled wall of each aperture being the wall of the aperture opposite the ramp of an adjacent cam portion of said lock rod.

18. The clamping apparatus of claim 17, wherein the angled aperture wall is inclined between about 10° and 20° with respect to a line orthogonal to the stroke axis, and the length of the lock rod stroke is reduced between about 5% and 25%.

19. The clamping apparatus of claim 17, wherein the improvement further comprises an elongation of each of the apertures in the canister member along the axis for allowing the locking elements to move axially along the cam portions of the lock rod such that the locking elements move into locking engagement with the tool unit with a shorter axial stroke of the lock rod.

* * * * *